Dec. 26, 1961   R. B. CRANE ET AL   3,015,102
LENS REFLECTOR
Filed Oct. 2, 1959

INVENTORS
ROBERT B. CRANE
WINSTON E. KOCK
BY
ATTORNEY

3,015,102
LENS REFLECTOR
Robert B. Crane and Winston E. Kock, Ann Arbor, Mich., assignors to The Bendix Corporation, a corporation of Delaware
Filed Oct. 2, 1959, Ser. No. 844,038
2 Claims. (Cl. 343—911)

This invention relates to a lens type electromagnetic wave reflector.

A standard Luneberg spherical lens reflects plane waves along the same path as they are received. This is desirable where the wave transmitter and receiver are not separated in space. However, in instances where the transmitter and receiver are separated in space, it becomes necessary to provide a reflector which will reflect incoming plane waves as spherical waves having a sufficient angular spread to reach the receiver.

The object of this invention is to provide a spherical lens reflector capable of reflecting incoming plane waves as spherical waves having a predetermined angular spread.

The index of refraction "$n$" of the standard Luneberg spherical lens is expressed by the following equation:

$$n = \sqrt{2 - r^2} \tag{1}$$

where $r$ = variable radius inside the sphere.

Luneberg derived Equation 1 as follows:

$$n = \rho e^{\omega(\rho, r_0)} + \omega(\rho, r_1) \tag{2}$$

$$= \rho e^{\frac{1}{\pi} \int_\rho' \frac{\text{arc sin}}{\sqrt{t^2 - \rho^2}} t/r_0 dt + \frac{1}{\pi} \int_\rho' \frac{\text{arc sin}}{\sqrt{t^2 - \rho^2}} t/r_1 dt} \tag{3}$$

where
$\rho = nr$
$r_1$ = surface radius of the sphere
$r_0$ = distance between the center of the sphere and the center of the reflected wave
$t$ = variation of integration Equation 1 is derived from Equation 3 by making $r_1 = 1$ and by making $r_0 = \infty$ since in the Luneberg case incoming plane waves are reflected as plane waves having a center at infinity.

In accordance with this invention, $r_0$ is given a finite, negative value so that incoming plane waves will be reflected as spherical waves having an angular spread depending on the value of $r_0$. If we let $r_0 = -r_0$, the power $\omega(\rho, r_0)$ in in Equation 2 may be expressed as follows:

$$\omega(\rho, r_0) = \frac{1}{\pi} \int_\rho' \frac{\text{arc sin} - t/r_0}{\sqrt{t^2 - \rho^2}} dt \tag{4}$$

$$\approx -\frac{1}{\pi} \int_\rho' \frac{t/r_0}{\sqrt{t^2 - \rho^2} dt} \tag{5}$$

$$= \frac{-\sqrt{1 - \rho^2}}{\pi r_0} \tag{6}$$

If we let $r_1 = 1$, the power $\omega(\rho r_1)$ in Equation 2 may be expressed as follows:

$$\omega(\rho, r_1) = \frac{1}{\pi} \int_\rho' \frac{\text{arc sin } t/r_1}{\sqrt{t^2 - \rho^2}} dt \tag{7}$$

or $$= \frac{1}{\pi} \int_\rho' \frac{\text{arc sin } t}{\sqrt{t^2 - \rho^2}} dt \tag{8}$$

$$= \frac{1}{2} \log (1 + \sqrt{1 - \rho^2}) \tag{9}$$

Substituting Equations 6 and 9 in Equation 2 we have:

$$n = e^{\frac{-\sqrt{1-\rho^2}}{\pi r_0} + \frac{1}{2} \log (1 + \sqrt{1-\rho^2})} \tag{10}$$

or $$n = \sqrt{1 + \sqrt{1 - \rho^2}} \cdot e^{\frac{-\sqrt{1-\rho^2}}{\pi r_0}} \tag{11}$$

Since $\rho = nr$ we have $$n = \sqrt{1 + \sqrt{1 - (nr)^2}} \left( e^{\frac{-\sqrt{1-(nr)^2}}{\pi r_0}} \right) \tag{12}$$

Equation 12 expresses the index of refraction required in a spherical lens to obtain a spherical wave reflection from incoming plane waves.

Figure 1:
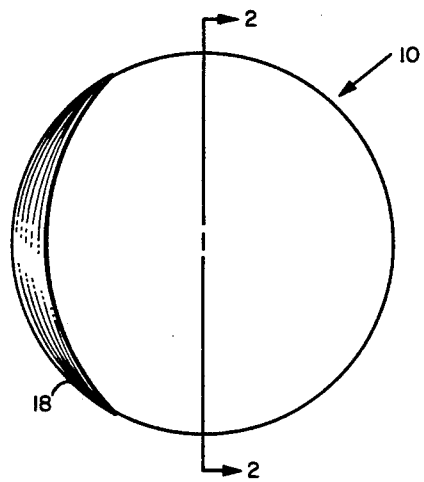
FIGURE 1 is a spherical lens reflector constructed in accordance with this invention.
Figure 2:
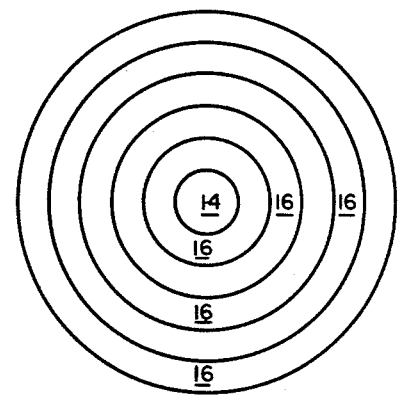
FIGURE 2 is a cross sectional view taken substantially at 2—2 of FIGURE 1.
Figure 3:
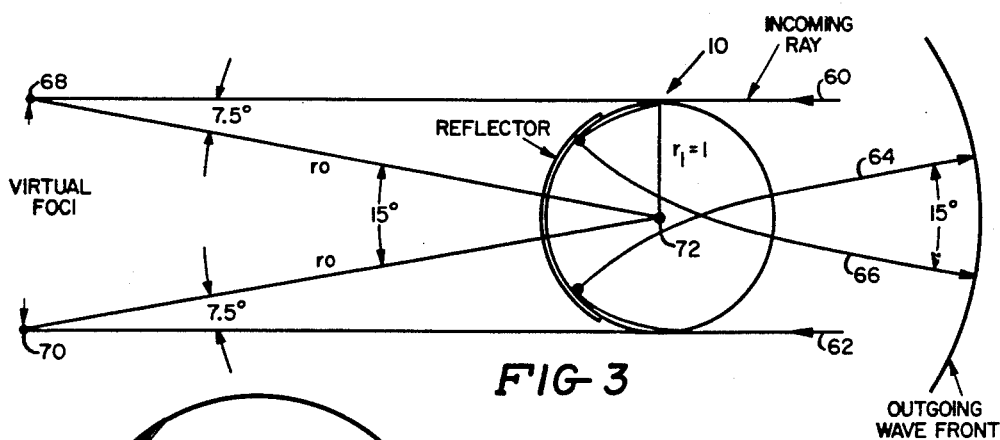
FIGURE 3 is a schematic diagram of the lens in FIGURE 1.

The spherical lens generally indicated at 10 in FIGURE 1 is constructed in accordance with this invention to have an index of refraction expressed by Equation 12. The lens 10 is constructed with a spherical core 14 and a plurality of concentric shells 16. The core and the shells are made of a light refracting material such as molded polyethylene foam plastic. Each shell 16 is made of two half shells which are joined together over the shell of lesser diameter. Also, each shell 16 is made of sufficient density to have an index of refraction depending on the value or $r_0$ and its median range $r$ from the center of the sphere. When all the shells are concentrically mounted, they form a spherical lens having an index of refraction substantially in accordance with Equation 12. A reflector 18 is attached to the lens 10 to reflect incoming plane waves with an angular spread as shown in FIGURE 3.

In constructing a spherical lens in accordance with this invention, it is first decided what angular spread is desired from a plane wave. For example, it may be decided that a 15° spread is desired, in which case rays 60 and 62 of a plane wave would emerge as rays 64 and 66, respectively, having a 15° spread as shown in FIGURE 3. In this figure, point 68 represents the center of the incoming ray 60 and the emerging ray 66. Similarly, the point 70 represents the center of the incoming ray 62 and the emerging ray 64. The distance between the center 68 and the center 72 of the sphere 10 is $r_0$. The distance between the centers 70 and 72 is the same as the distance between centers 68 and 72 and is also $r_0$.

Since the angular spread between rays 64 and 66 is 15°, the angle of reflection of each ray from the incoming rays 60 and 62 is one half this amount or 7.5°. Accordingly, if we let $r_1 = 1$, as shown in FIGURE 3, we arrive at the following $$\frac{1}{r_0} = \text{sine } 7.5° \tag{13}$$

or $$r_0 = \frac{1}{\text{sine}} 7.5° \tag{14}$$

$$= \frac{1}{.1305} = 7.66 \tag{15}$$

Substituting the value $r_0 = 7.66$ in Equation 12, the index of refraction "$n$" for each shell 16 can be solved on a computer since the median radius "$r$" for each shell would be known. Then each shell may be molded from the polyethylene of sufficient density to achieve the desired index of refraction.

In the same manner as above, a spherical lens may be constructed to achieve any desired angular spread to accommodate the distance that a transmitter and a receiver are spaced apart.

Figure 4:
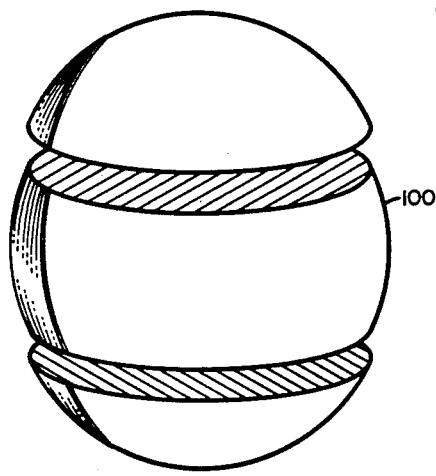
FIGURE 4 shows a second embodiment of this invention.

Although this invention has been described in connection with a spherical lens, its principles would also be applicable to any two dimensional lens corresponding to a central portion of a spherical lens. For example, the two dimensional lens 100 in FIGURE 4 would function in the same way within a limited range of angular spread.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

Having thus described our invention, we claim:

1. A lens reflector, including, a lens being substantially spherical in shape and having a refractive index "$n$" expressed by the following mathematical formula:

$$n = \sqrt{1 + \sqrt{1-(nr)^2}} \cdot \left( e^{\frac{-\sqrt{1-(nr)^2}}{\pi r_0}} \right)$$

where $r$ = variable radius from the center of the lens to the surface of the lens;

$r_0$ = the distance between the center of the lens and the center of the reflected wave;

$e$ = the base of the system of natural logarithms and reflector means covering a portion of the lens surface.

2. A lens reflector, including, a lens corresponding in shape to a central portion of a sphere and having a refractive index "$n$" expressed by the following mathematical formula:

$$n = \sqrt{1 + \sqrt{1-(nr)^2}} \cdot \left( e^{\frac{-\sqrt{1-(nr)^2}}{\pi r_0}} \right)$$

where $r$ = variable radius from the center of the lens to the surface of the lens;

$r_0$ = the distance between the center of the lens and the center of the reflected wave;

$e$ = the base of the system of natural logarithms and reflector means covering a portion of the lens surface.

References Cited in the file of this patent

Pub. I, IRE Transaction on Antennas & Propagation AP-7, Jan. 1959, pp. 32–34.

Pub. II, Journal of Applied Physics, September 1958, pp. 1358–1368.